350-96.1
5/20/86 XR 4,590,492

United States Patent [19] [11] Patent Number: 4,590,492
Meier [45] Date of Patent: May 20, 1986

[54] HIGH RESOLUTION OPTICAL FIBER PRINT HEAD

[75] Inventor: Michael J. Meier, Diamond Bar, Calif.

[73] Assignee: The United States of America as represented by the Secretary of the Air Force, Washington, D.C.

[21] Appl. No.: 502,028

[22] Filed: Jun. 7, 1983

[51] Int. Cl.[4] ........................ G01D 9/42; G03B 27/00; G03B 15/00; B41B 13/00

[52] U.S. Cl. ................................ 346/107 R; 250/227; 350/96.1; 350/96.24; 354/4; 354/5; 355/1; 355/3 R; 65/4.3

[58] Field of Search ............................... 250/105, 227; 346/107 R, 108; 350/96.1-96.31; 354/5, 4; 355/1, 3 R; 65/4.3

[56] References Cited

U.S. PATENT DOCUMENTS

| | | | |
|---|---|---|---|
| 3,125,812 | 3/1964 | Simpson | 35/3 |
| 3,145,247 | 8/1964 | Meltzer | 88/1 |
| 3,411,011 | 11/1968 | Genahr et al. | 250/227 |
| 3,556,636 | 1/1971 | Roberts et al. | 350/96 |
| 3,615,313 | 10/1971 | Phaneuf | 65/4 |
| 3,633,031 | 1/1972 | Peace et al. | 250/83.3 H |
| 3,663,194 | 5/1972 | Greenstein et al. | 65/43 |
| 3,864,034 | 2/1975 | Yevick | 353/120 |
| 3,988,742 | 10/1976 | Meier et al. | 346/107 R |
| 4,045,133 | 8/1977 | Carlson | 355/1 |
| 4,101,188 | 7/1978 | Yevick | 350/96.24 |
| 4,184,762 | 1/1980 | Guzman | 355/1 |
| 4,185,888 | 1/1980 | Quelle, Jr. | 350/96.25 |
| 4,255,754 | 3/1981 | Crean et al. | 346/75 |
| 4,279,483 | 7/1981 | England et al. | 354/5 |
| 4,376,282 | 3/1983 | Kotani et al. | 346/107 R |
| 4,389,655 | 6/1983 | Baues | 346/107 R |
| 4,435,064 | 3/1984 | Tsukada et al. | 355/1 |
| 4,447,126 | 5/1984 | Heidrich et al. | 350/96.31 |

*Primary Examiner*—E. A. Goldberg
*Assistant Examiner*—Gerald E. Preston
*Attorney, Agent, or Firm*—Donald J. Singer; Stanton E. Collier

[57] ABSTRACT

A high resolution printing head for a line printer using photographic recording medium has a plurality of modules connected to form a two dimensional printing array. Each module has three fiber optic ribbons bonded together to form a staggered array of fibers. An apertured mask is photolithographically attached to the two dimensional array so that there is one aperture positioned over each fiber. The aperture has a cross-section less than the fiber so there is no overlapping of output light from each fiber and the apertures are also staggered so that a three fold increase in line density is achieved over conventional single ribbon arrays.

4 Claims, 4 Drawing Figures

FIG. 1
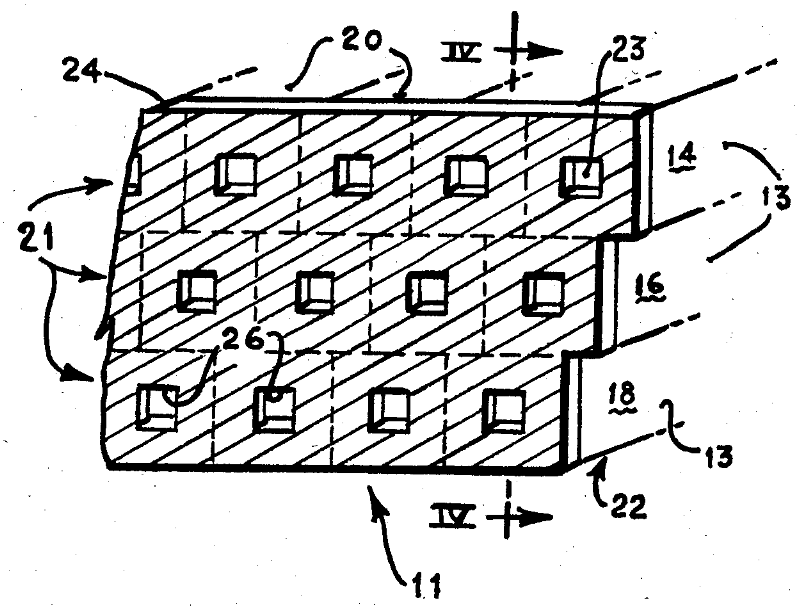
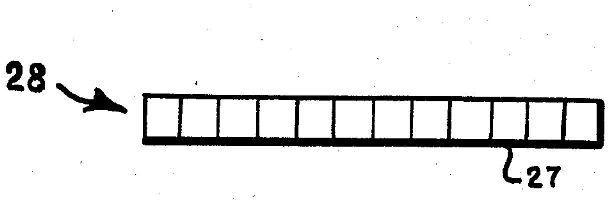
FIG. 2
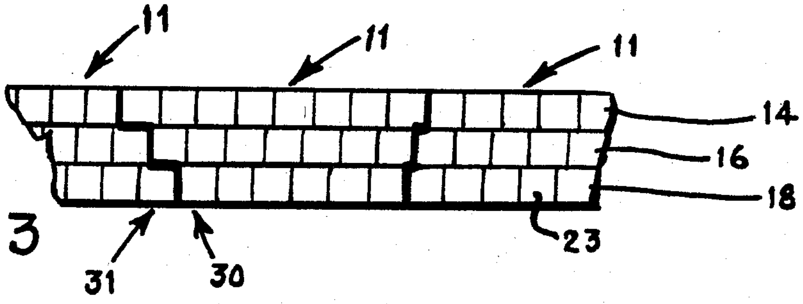
FIG. 3
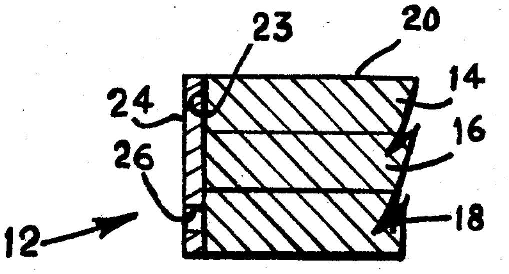
FIG. 4

HIGH RESOLUTION OPTICAL FIBER PRINT HEAD

The invention described herein may be manufactured and used by or for the Government for governmental purposes without the payment of any royalty thereon.

BACKGROUND OF THE INVENTION

This invention relates generally to photographic printers, and, in particular, relates to a structure and a method of fabrication of a high resolution, linear array, printing head for use in a line printer.

The use of multiple light sources to record information on photographic films is well known. One prior art device is that disclosed by U.S. Pat. No. 3,988,742, titled "Recorder Using Light Emitting Diodes," having a plurality of light emitting diode (LED) units receiving signals from a sampling signal generator. The data is presented as parallel binary signals to the sampling signal generator. A plurality of fiber optic fibers, tapered or untapered, coherent or incoherent, are connected to the LEDs. The outputs of these fibers are arranged in a linear array in a direction transverse to the direction of motion of the recording medium. Focusing means in front of each fiber cause the light to be focused to a point on the recording medium to form a printed element. This array acts as a recording head for the above device.

The density of the printing elements in this linear array is limited by the cross-sectional dimension of the fiber. The use of increasingly thinner fibers to obtain a higher density of printed elements results in increased difficulties in the assembly of the printing head. The precision of alignment becomes more difficult and the fibers break too readily in the assembly process.

The present invention is directed toward providing a printing head in which these undesirable characteristics are minimized.

SUMMARY OF THE INVENTION

The present invention overcomes the problems encountered in the past and described hereinabove by providing a high resolution printing head which is capable of printing higher density printed elements.

A set of two dimensional printing elements is constructed of multiple layers of fiber optic ribbons bonded in a staggered manner to provide a module of printing elements. In order to prevent overlapping of light output from each fiber, an apertured mask is placed in front of each module of printing elements. Additional modules may be connected together to form a two dimensional linear array useful in printing information on a moving photographic medium. A light emitting device such as a light emitting diode is connected to each fiber and is driven by electronic means.

It is therefore one object of the present invention to provide for a printing head that produces a higher density of printed elements.

It is another object of the present invention to provide for a printing head having a two dimensional array of printing elements.

It is a further object of the present invention to provide for a printing head having staggered layers of fiber optic ribbons with coherent fibers therein.

It is a still further object of the present invention to provide for a method of fabricating a high resolution, linear array, printing head.

These and many other objects and advantages of the present invention will be readily apparent to one skilled in the pertinent art from the following detailed description of a preferred embodiment of the invention and related drawings.

BRIEF DESCRIPTIONS OF THE DRAWINGS

FIG. 1 is a partial pictorial view of one module of printing elements of the printing head of this invention;

FIG. 2 shows the line density of printed elements resulting from the module of FIG. 1.

FIG. 3 is a partial view of a two dimensional array having multiple modules of printing elements shown partially in FIG. 1.

FIG. 4 is a partial cross-section of the module shown in FIG. 1 taken along lines IV—IV.

DETAILED DESCRIPTION OF THE PREFERRED EMBODIMENTS

Referring to FIG. 1, a partial module 11 is shown in perspective. Module 11 has a plurality of ribbons 13 such as a first fiber optic ribbon 14, a second fiber optic ribbon 16 and a third fiber optic ribbon 18 bonded together. Additionally, an apertured mask 24 is fixedly attached to a printing head end 22 of ribbons 14, 16, and 18. Each horizontal ribbon is made of a plurality of fibers 20. The boundaries of each fiber 20 is shown outlined.

After ribbons 14, 16 and 18 are bonded together at printing head end 22, an end surface 23, FIGS. 1, 3, and 4, of fibers 20 is made substantial planar by polishing. Polished end surface 23 has an apertured mask 24 deposited thereon using conventional photolithographic techniques. Apertured mask 24 has a plurality of apertures 26, only one shown in FIG. 3. Each aperture 26 is centered on a single fiber 20. Although a square aperture 26 is shown other shapes are equally feasible depending on the application.

Referring to FIG. 1, it is seen that each aperture 26 in second fiber optic ribbon 16 is displaced a short horizontal distance from apertures 26 in third fiber optic ribbon 18, and further each aperture 26 in first fiber optic ribbon 14 is displaced also a short horizontal distance from apertures 26 in second fiber optic ribbon 16. Each fiber 20 with apertured mask 24 forms a printing element 21. Each printing element 21 in FIG. 1 when pulsed by an LED, for example, causes a printed element 27, FIG. 2, to be placed on the recording medium moving past the printing head.

Line density 28 of printed elements 27 is shown in FIG. 2. Line density 28 resulting from staggered three ribbon arrangement is three times that which is possible from a single ribbon assuming that fibers 20 have the optimum diameter for this application. The particular arrangement of printed elements 27 shown in FIG. 2 results when ribbons 14, 16, and 18 are pulsed sequentially and synchronized with the movement of the recording medium. Also, the approximate number of ribbons 13 is equal to the fiber 20 diameter divided by the aperture 26 width. This is practically limited by the optimum aperture width which is directly related to the amount of energy needed to cause the recording medium to react. It is clearly seen that high precision in both the horizontal and vertical direction is required to bond ribbons 13 together so that fibers 20 are staggered the proper amount from each ribbon 13.

A method of connecting multiple modules 11 of 21 fibers each per module 11 is shown in FIG. 3. Identical modules 11 are connected by butting each ribbon side 30 to the next adjacent fitting ribbon side 31 of inverted module 11. The connecting of modules 11 can be continued to make a composite printing head, not shown in any greater detail.

Although not shown, conventional focusing means may be placed in front of mask 24 to further reduce line density 28 at the printing surface of the recording medium, not shown.

For example, a preferred printing head may be made of 8 to 10 inch long fibers epoxy-bonded together with a polished surface 23. Apertured mask 24 is made preferably of inconel having a thickness of about 0.06 to 0.1 microns. Apertures 26 may be 0.5 mils square centered on each fiber 20 having a 1.5 mil diameter cross-section.

If the printing head is composed of an array as shown in FIG. 3 where each module 11 has twenty-one printing elements 21 then a possible printed element 27 would be 12 mils square with a total of 441 printed elements 27 per printed character caused by response of the recording medium by each aperture 26 as the recording medium moves past the printing head.

The control of the LEDs connected to fibers 20 is feasible by electronics such as shown in U.S. Pat. No. 3,988,742 with modification to account for the layered ribbons 13 and staggered printing elements 21.

Clearly, many modifications and variations of the present invention are possible in light of the above teachings and it is therefore understood, that within the inventive scope of the inventive concept, the invention may be practiced otherwise than specifically claimed.

What is claimed is:

1. A module for a printing head of a line printer comprising:

a plurality of fiber optic ribbons having therein fiber optic bundles in linear assemblies each of said fiber optic ribbons having an input end and an output end, said input end being adapted to receive a plurality of light sources, said input end having one light source for each of said bundles, said output end of each of said ribbons being bonded to an adjacent ribbon output end, an array of bonded bundles being formed having therein a plurality of substantially parallel rows, the bundles of each row being staggered with respect to bundles in adjacent rows, said array of bonded bundles having a substantially flat surface; and a mask being photo-lithographed onto said substantially flat surface, said mask having a plurality of apertures therein, each of said apertures being centered on a fiber optic bundle in said output end, each of said apertures having a width less than said fiber optic bundle, a closest aperture in an adjacent fiber optic ribbon being offset a horizontal distance approximately equal to said width of said apertures, said plurality of ribbons being equal to an integral number of aperture widths between two adjacent apertures in a row plus one.

2. A module as defined in claim 1 wherein said plurality of fiber optic ribbons is three.

3. A module as defined in claim 2 wherein said apertures formed in said mask are rectangular shaped.

4. A method of fabricating a printing head comprising the steps of:

bonding output ends of fiber optic ribbons together to form a module having a staggered two dimensional array of fibers;

polishing said two dimensional array to a substantially flat surface;

applying photolithographically to said two dimensional array an apertured mask, said apertured mask having one aperture for each of said fibers, said aperture over each of said fibers having a cross-section substantially less than the cross-section of said fibers; and bonding a plurality of masked modules to form a printing head having a two dimensional array of printing elements.

* * * * *